Dec. 9, 1958 W. J. BABCOCK 2,863,334
REVERSIBLE POWER TRANSMISSION, ESPECIALLY
FOR ROTARY TOOLS
Filed Sept. 27, 1957 2 Sheets-Sheet 1

INVENTOR.
William J. Babcock
BY

Dec. 9, 1958  W. J. BABCOCK  2,863,334
REVERSIBLE POWER TRANSMISSION, ESPECIALLY
FOR ROTARY TOOLS
Filed Sept. 27, 1957  2 Sheets-Sheet 2

INVENTOR.
William J. Babcock

2,863,334
REVERSIBLE POWER TRANSMISSION, ESPECIALLY FOR ROTARY TOOLS

William J. Babcock, Oakland, Calif.

Application September 27, 1957, Serial No. 686,700

9 Claims. (Cl. 74—788)

The present invention relates to power transmissions of the type adapted to transmit rotary power at reduced speed from a drive shaft to a driven shaft. More particularly the present invention relates to power transmissions in the form of attachments that may be secured to an available drive shaft to deliver its rotary power at a reduced speed to a rotary tool, such as a drill, a tap, a screw driver, a socket wrench and the like.

It is an object of my invention to provide a power transmission attachment, of the type referred to, that combines compactness and simplicity of construction with ease of manipulation.

Another object of the invention is to provide a power transmission arrangement, of the type referred to, that is easy to assemble and disassemble.

Another object of the invention is to provide a power transmission attachment of the type described that is reversible.

More specifically it is an object of the invention to provide a power transmission device that may be coupled to a rotary drive shaft and which may readily be manipulated, during operation, to idle or to drive a rotary tool attached thereto.

Another object of the invention is to provide a power coupling attachment that may readily be manipulated to selectively drive a rotary tool in forward or in the reverse direction.

Still another object of the present invention is to provide a reversible power transmission arrangement that is specifically adapted to operate taps in that it will drive a tap secured thereto in one direction when the tap is pressed against the work to cut an internal thread, and will instantly and automatically reverse itself and drive the tap in the opposite direction when the tap is pulled away from the work.

A further object of the invention is to provide a power transmission attachment that may be employed to apply rotary power in either direction to a rotary tool secured thereto, as long as an external housing surrounding the transmission is held against rotation, and which will permit the tool to remain idle as soon as said housing is released.

Still another object of the present invention is to provide a power transmission device that may readily be manipulated to reverse the operation of a rotary tool secured thereto, and when so reversed, will apply the rotary power of its input shaft in a positive manner to said tool.

Another object of the invention is to provide a power transmission device, of the type referred to, that may readily be locked in drive-reversing position.

In this connection it is a specific object of my invention to provide a reversible, speed-reducing power coupling attachment, of the type referred to, that may be employed to drive or remove screws and nuts with power derived from the spindle of an electric hand drill.

These and other objects of the present invention will be apparent from the following description of the accompanying drawing which illustrates a preferred embodiment of the invention and wherein Figure 1 is a fragmentary exploded view of a power transmission attachment embodying my invention;

Figure 1:
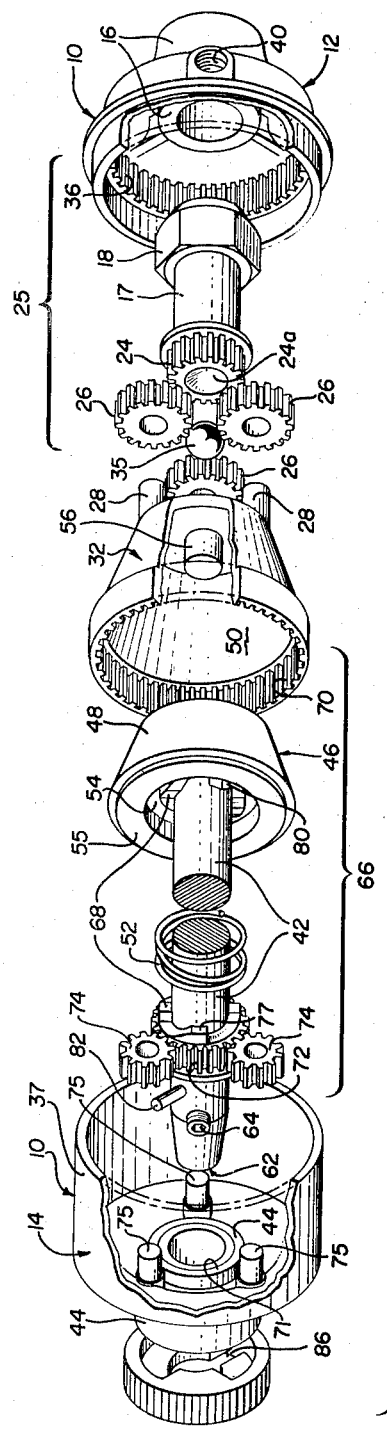

The power transmission attachment of my invention comprises an outer case or housing 10 which may be composed of a dome-shaped lid section 12 and a cup-shaped body portion 14 that are detachably held together such as by means of screws 15. The lid section 12 forms a centrally located neck 16 and held within said neck in such a manner as to be freely rotatable, but restrained from axial movement, is the input shaft 17 of the device which is of tubular construction. The outer end of said shaft is extended to form an external head 18 and its interior is threaded as shown at 20 to form a socket within which may be engaged an impeller shaft, such as the spindle of an electric drill (not shown). Firmly held within the inner end of the input shaft 17 is the stem 23 of a sun gear 24 which forms part of a planetary gear train collectively identified by the reference numeral 25. The sun gear 24 meshes with three planetary gears 26 that are arranged around the sun gear and are rotatably supported upon studs 28 projecting from the top 30 of a cage or spider 32 that is arranged in housing 10 in axial alignment with input shaft 17 and which is of hollow trunco-conical conformation. To properly locate the spider 32 with regard to the input shaft 17 in a manner permitting free rotation of said components relative to each other about their common axis, the free face of the sun gear 24 and the top surface of the spider are each provided with a central depression 24a and 30a respectively, and seated in and between said depression is a steel ball 35. The planetary gears 26 are also enmeshed with an internal ring gear 36 that is arranged concentrically around the sun gear 24 and which is formed along the inner surface of the dome-shaped lid 12 of housing 10.

Figure 4:
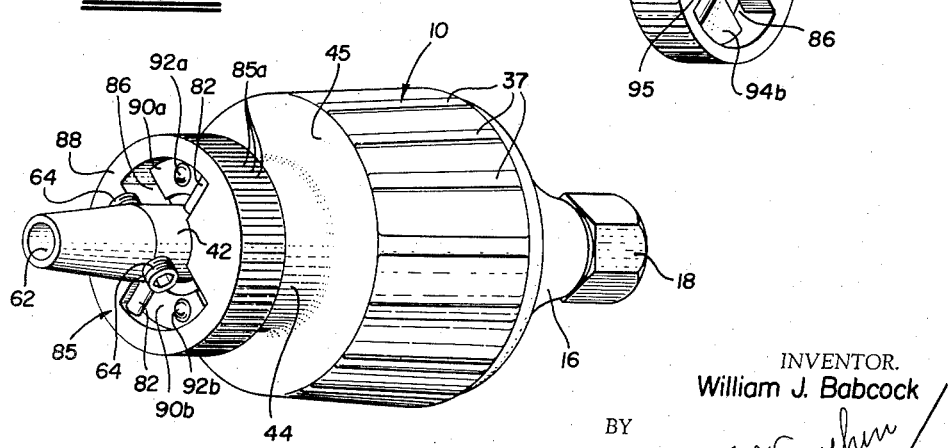
Figure 4 is a perspective of the power transmission attachment viewed from a point in front of the power output end thereof.

Whenever the input shaft 17 is turned in clockwise direction, as viewed from a point in front of lid 12, the planetary gears 26 enmeshed with the sun gear 24 at the end of the input shaft, will walk along the ring gear 36 around the sun gear in a clockwise direction, provided the ring gear is held stationary. This may be accomplished by firmly gripping the housing 10, and for this purpose shallow axially extending ribs 37 may be provided on the external surface of the housing body 10 (Figure 4). Alternatively, the threaded end of a rod 38 (Figure 2) may be engaged in a radially extending threaded socket 40 provided in the outside of the lid 12 and may be arranged to bear against an abutment such as the column of a drill press (not shown) on the counter-clockwise side of the rod, to block clockwise rotation of the rod and hence of housing 10. When the planetary gears 26 are forced to walk along the stationary ring gear 36 about the sun gear 24 in clockwise direction as viewed from the outside of lid 12, they compel the cage or spider 32 upon which they are mounted, to turn likewise in a clockwise direction at a reduced speed and with increased torque as compared with the rotary speed of input shaft 17. Means are provided that are ordinarily effective to transmit the rotary motion of the spider directly to an output shaft 42 which mounts the tool that is to be operated and which is rotatably supported within a centrally located neck 44 formed in the bottom 45 of the cup-shaped body portion 14 of housing 10, in axial alignment with the spider 32 and the input shaft 17 in such a manner that it may slide within said neck in axial direction. Said shaft 42 carries firmly secured to its inner end a trunco-conical head 46 provided with a friction lining 48 made of rubber or a suitable friction composition. The conical head 46 forms the male part of a friction clutch whose female part is formed by the hollow conical body portion 50 of the spider 32. To hold the spider 32 in its properly centered position within the housing 10 and relative to the input shaft 17 and the output shaft 42, the interior of said spider is provided with a central axially extending stem 56 which passes through an aperture 57 in the top of the conical head 46 and is rotatably received in a cylindrical recess 58 in the inner end face of the output shaft 42. The outer end of output shaft 42 is of tubular conformation to form a socket 62 for the reception of the stem of a tool, such as a drill, a bit or a tap, or of a suitable adapter, which may be held in said socket by means of set screws 64 that engage radial apertures 65 provided in the wall of the tubular shaft end.

Thus, whenever rotary power is applied to the input shaft 17 of the described device, and the housing 10 is gripped firmly by an operator, or otherwise held against rotation, the turning sun gear 24 forces the planet gears 26 to revolve along the stationary ring gear 36 about the sun gear, which causes the spider 32 to turn about its axis at a reduced speed; and due to the frictional engagement of its inner conical surface with the lined outer surface of the conical head 46, which is established when a tool mounted in the output shaft is pressed against the work, the spider in turn forces the output shaft 42 to turn with the same rotary speed and operate said tool. On the other hand, if the housing 10 is released, there is not sufficient reactive force exerted upon the planetary gears to cause them to revolve around the sun gear and turn the spider 32. To the contrary, the resistance of the work to rotation of the tool in the end of output shaft 42 sets up a reactive force which holds the spider 32 against rotation and causes the ring gear 36 and hence the housing 10 to turn in a clockwise direction, as viewed from a point in front of the lid 12.

In accordance with my invention I provide means that is automatically effective to reverse the operation of the output shaft 42 whenever an adequate outward pull is exerted upon the said shaft to disengage the conical head 46 from the inner surface of the spider body 50. For this purpose I interpose a second planetary gear train collectively identified by the reference number 66 between the spider 32 of the first planetary gear train 25 and the output shaft 42 and I arrange a normally disengaged ratchet clutch 68 between a driven component of said second planetary gear train and the conical head 46 on the output shaft 42, which clutch is effectively engaged when sufficient outward pull is exerted upon the output shaft to disengage said head from operative contact with the inner surface of the spider 32.

Figure 3:
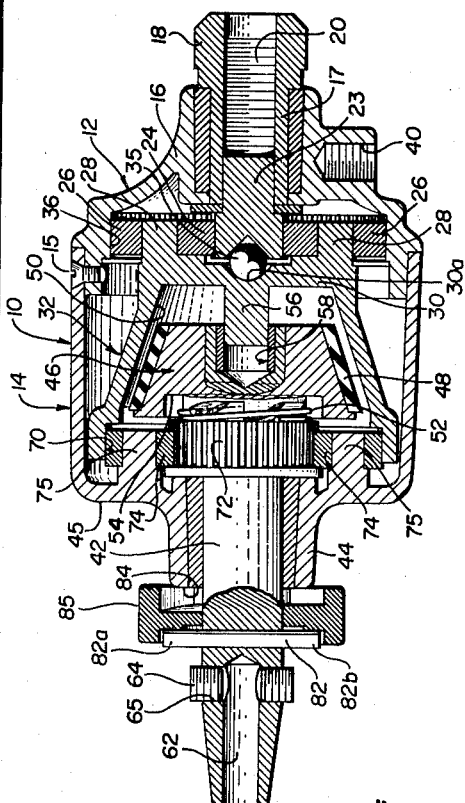
Figure 3 is another longitudinal central section through the power transmission attachment illustrating it in its drive-reversing position.

Having reference to Figures 1 and 3, the bottom edge of the conical clutch member 50 which forms part of the spider 32, carries an internal ring gear 70, and loosely mounted upon the output shaft 42 adjacent the inner edge 71 of the neck 44 in the housing body 14 is an external gear 72 of annular conformation that is ordinarily freely rotatable about the output shaft 42. Interposed between, and enmeshed with, said annular gear 72 and the internal ring gear 70 are three planetary gears 74 which are rotatably mounted upon studs 75 that project inwardly from the bottom 45 of the cup-shaped body portion 14 of housing 10. When the annular gear 72 is in the position shown in Figure 2, wherein it may turn loosely upon the shaft 42, the planetary power train 70, 72, 74 remains without effect upon the operation of the device. Whenever clockwise rotary power is applied to the input shaft 17 of the device, and the housing 10 is gripped firmly by the operator, the resultant clockwise rotation of spider 32 and hence of the internal ring gear 70 will cause the planetary gears 74 to turn in clockwise direction upon their stationary studs 75, which causes the annular gear 72 to idle in counter-clockwise direction upon the output shaft 42, as viewed from the lid end of the device. Similarly, if the housing is released, while clockwise rotary power is applied to the input shaft 17, and said housing turns in counter-clockwise direction, with the cage 32 and its ring gear 70 remaining substantially stationary in space, the planetary gears 74 walk along said stationary ring gear 70 in a counter-clockwise direction while turning in counter-clockwise direction upon the studs 75, and impart a clockwise idling movement to the annular gear 72 upon output shaft 42, which remains without effect upon said shaft.

Figure 2:
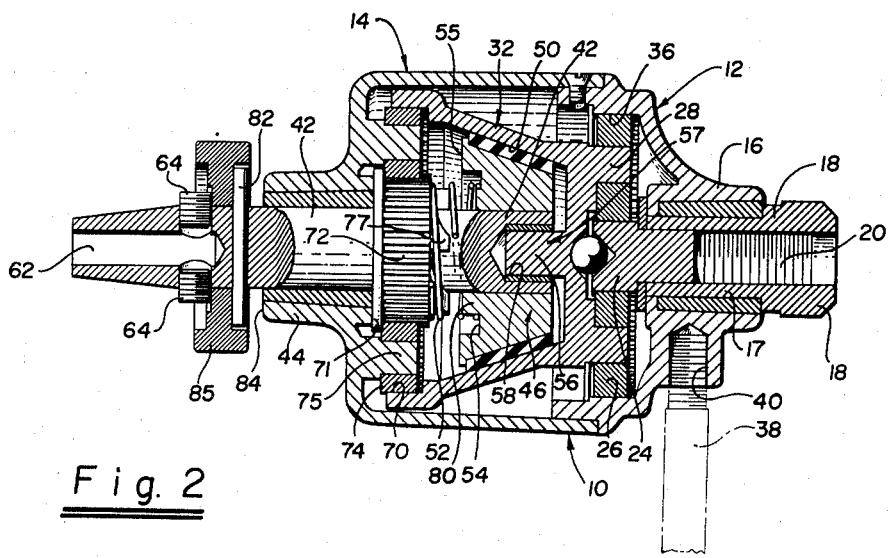
Figure 2 is a longitudinal central section through the power transmission attachment shown in Figure 1.

The annular gear 72, however, carries upon its inwardly facing edge a sequence of ratchet teeth 77 (Figure 1), and provided in an annular recess 54 in the base of the conical head 46 is a ring of corresponding ratchet teeth 80. A spring 52 coiled around the output shaft 42 and effectively interposed between the annular sun gear 72 and the annular recess 54 keeps the ratchet teeth 77 and 80 dependably apart under ordinary conditions, but when a sufficient outward pull is exerted upon the shaft 42, the clutch cone 46 is disengaged from the inner conical surface of the spider 32, and the ratchet teeth 80 on the base of said cone are brought into engagement with the ratchet teeth 77 upon the inner edge of the annular gear 72. In this condition when the input shaft 17 is rotated in clockwise direction, as viewed from the lid end of the device, while the housing 10 is held against rotation, the spider 32 turns again in clockwise direction, but is now unable to transmit its clockwise rotary movement directly to the output shaft 42. The rotating ring gear 70 along the edge of the spider 32, however, imparts clockwise rotation to the planetary gears 74 which are supported from the floor 45 of the stationary housing 10, and said planetary gears in turn impart counter-clockwise rotation to the annular gear 72; and since this gear is now positively coupled to the head 46 upon the output shaft 42 through the interengaged ratchet teeth 77 and 80, the output shaft will turn in counter-clockwise direction, and as the flow of power through the planetary gear train 66 occurs in the direction from the large diameter outer ring gear 70 to the annular sun gear 72 which has a substantially smaller diameter, the output shaft will turn at an increased speed as compared with the rotational speed of the spider 32. Hence, a tap secured to the end of the output shaft 42 will turn in counter-clockwise direction at an increased speed and with a reduced torque as compared with the speed and torque with which it turned when it was employed to cut an internal thread, which is effective to unwind and withdraw the tool from the threaded hole in less time and with less danger that the newly cut threads may come to harm during the unwinding operation. In a preferred embodiment of my invention constructed as illustrated in Figures 1, 2 and 3, I have found it advantageous to dimension the first planetary gear train 25 in such a manner that the spider 32 turns at about one fifth of the speed of the input shaft 17 so that the output shaft 42 may also turn at about one fifth of the rotary speed applied to the input shaft when the device of the invention is operated in clockwise or forward direction; and I found it advantageous to dimension the second planetary gear train 66 in such a manner that the annular sun gear 72 and hence the output shaft 42 will turn at about twice the speed of the ring gear 70 on spider 42. Hence, when operated in reverse, the output shaft 42 turns with about twice the speed with which it turns in forward direction, but still less than half the speed of the input shaft 17. Thus, the output shaft develops a lesser speed and a higher torque when used to operate a tool to drill a hole, cut a thread or tighten a screw or nut, and a greater speed but a lesser torque when used to withdraw a tap, or remove a screw or nut.

For certain operations, such as for the removal of screws and the unscrewing of nuts, it is desirable to lock the power transmission attachment of my invention in its drive-reversing position. For this purpose, a cross pin 82 is mounted in the outwardly projecting end portion of the output shaft 42 above the inner end of the tool receiving socket 62 thereof, and by pulling the output shaft outwardly until its conical head 46 is disengaged from the spider 32 and the ratchet teeth 80 on the base of said head become engaged with the ratchet teeth 77 on sun gear 72, and by placing a suitable wedge between the outer shoulder 84 of neck 44 and the projecting ends 82a and 82b of said pin, the device of the invention may be permanently held in its drive-reversing position (Figures 3 and 4). Said wedge may have the form of a disk-shaped lock nut 85 with a knurled edge 85a, that fits loosely over the output shaft 42 and is provided with a diagonal slot 86 of such size as to permit the nut to be passed over the projecting pin ends into the space between the pin and the annular shoulder 84 (Figure 3). The outer face 88 of the nut is recessed adjacent the opposite ends of the diagonal slot 86 to form countersunk surfaces 90a and 90b (Figure 4) that are provided with spring loaded detent balls 92a and 92b. While the lock nut 85 is held against the annular shoulder 84 with the pin ends received in its diagonal slot 86, the operator pulls the protruding end of the output shaft outwardly until the pin ends lie adjacent the surfaces 90a and 90b formed on said nut (Figure 3), whereupon he twists the nut while holding the output shaft in a stationary condition, until the projecting pin ends have negotiated the detent balls 92a and 92b, respectively, and are safely retained behind said balls (Figure 4). The device of the invention is now dependably locked in its drive-reversing position (Figure 3).

When operating the device in its drive-reversing position, such as for instance to remove screws or nuts, the rotation of the output shaft 42 may be stopped instantly, whenever necessary, by releasing the housing 10 of the device. When this occurs, the housing will rotate in clockwise direction, while the resistance encountered by the tool causes the tool and the output shaft to come to a halt.

To keep the lock nut 85 upon the device of my invention so as to have it at all times available, when it is desired to lock the device in its drive-reversing position, I provide counter-sunk camming surfaces 94a and 94b (Figure 5) on the reverse side 95 of the nut adjacent the opposite ends of its diagonal slot 86, and whenever it is desired to return the device to its forward or direct drive position, I turn the nut 85 while holding the output shaft 42 in stationary condition until the pin ends have negotiated the detent balls 92a and 92b and align themselves with the slot 86 in the nut. I then pull the nut away from the annular shoulder 84 of the housing 10 until it comes against, and is stopped by, the projecting ends of the set screws 64 in the tool-mounting socket 62 (Figure 2).

Figure 5:
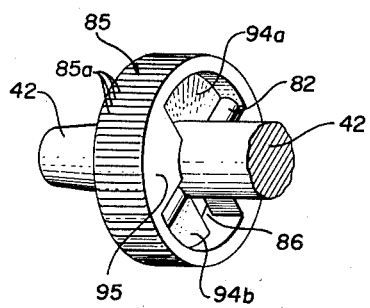
Figure 5 is a perspective showing the rear side of a lock nut mounted upon the output shaft of the power transmission attachment.

When the nut is in this position, the projecting pin ends are located adjacent, and slightly above, the lowest parts of the camming surfaces 94a and 94b, respectively, on the reverse side 95 of the nut. It is now only necessary to turn the nut in the appropriate direction, while holding the output shaft against rotation, to wedge the rising camming surfaces 94a and 94b underneath the projecting ends of the pin 82 and in this manner tighten the nut against the projecting ends of the set screws 64 (Figure 5). The nut is now held firmly upon the output shaft 42 in a position somewhat removed from the annular shoulder 84 of the housing bottom 45 (Figure 2) and turns with the shaft in clockwise direction, without interfering in any way with the operation of said shaft.

The power coupling attachment of my invention is of a compact and simple construction. It is inexpensive to manufacture and it can easily be disassembled and reassembled. It may be driven from high speed drills and will provide the proper reduction and a corresponding increase in torque which are necessary to operate heavier tools than those for which the drill may be designed. The device of my invention is easy to manipulate during practical use. It is merely necessary to turn on the power for the impeller to which it may be coupled, and to press the tool mounted in its output shaft against the work while firmly holding the housing. It is easy for the operator to bring the tool instantaneously to a stop by simply releasing the housing, whether the device is in its forward or in its drive-reversing position. When employing the device of the invention for tapping, its operation may readily be reversed to withdraw the tapping tool from the threaded hole upon completion of the tapping operation. It is merely necessary to pull the device of the invention away from the tapped work, and the resultant outward pull exerted upon the output shaft 42 by engagement of the tap with the newly cut threads, is sufficient to cause instant reversal in the operation of the shaft at an increased speed and a reduced torque which speeds up the withdrawal of the tool and safeguards the newly cut threads during the withdrawal operation. With the device of my invention it is a simple matter to permanently lock it in its drive-reversing position, so that it may be used for removing screws and nuts; and when in this position, the power transmission established by the device of the invention between the drive shaft 17 and the output shaft 42 which mounts the tool, is positive, which is essential to be able to remove screws and nuts.

While I have described my invention with the aid of a particular embodiment thereof, it will be understood that the invention is not limited to the specific constructional details illustrated and described by way of example, which may be departed from without departing from the spirit and scope of my invention.

I claim:

1. A power transmission arrangement, comprising a shaft, a friction clutch having relatively movable female and male clutch members, said male clutch member being firmly mounted upon said shaft for rotation therewith, means for applying rotary power to said female clutch member to apply rotary power through said male clutch member in a forward direction to said shaft, a planetary gear train including a ring gear secured to said female clutch member, an annular sun gear loosely mounted upon said shaft, and planetary gears interposed between said ring gear and said sun gear, ratchet teeth on the edge of said sun gear, and corresponding ratchet teeth on said male clutch member adapted to engage the ratchet teeth on said annular sun gear when said male clutch member is removed from said female clutch member, so as to apply the rotary power of said female clutch member through said planetary gear train in reverse direction and at a changed rate of speed to said shaft.

2. A power transmission arrangement, comprising a rotary shaft mounted for axial movement, a friction clutch having a female clutch member and a male clutch member, means for applying rotary power to said female clutch member, said male clutch member being firmly mounted upon said shaft for rotation therewith and for movement into engagement with said female clutch member to impart upon engagement with said female clutch member the rotary power thereof to said shaft, a planetary gear train including a ring gear secured to said female clutch member, an annular sun gear loosely mounted upon said output shaft, and planetary gears interposed between said ring gear and said sun gear, ratchet teeth on the edge of said sun gear, and corresponding ratchet teeth on said male clutch member adapted to engage the ratchet teeth on said annular sun gear when said shaft with said male clutch member is moved axially away from said female clutch member, so as to apply the rotary power of said female clutch member through said planetary gear train in reverse direction and at a changed rate of speed to said shaft.

3. A power transmission arrangement for rotary tools comprising a rotary shaft mounted for axial movement, a friction clutch having a conically shaped female clutch member and a conically shaped male clutch member, means for applying rotary power to said female clutch member, said male clutch member being firmly mounted upon said shaft for rotation therewith, and for movement into engagement with said female clutch member to impart the rotary power thereof to said shaft, a planetary gear train including a ring gear secured to the base of said female clutch member, an annular sun gear loosely mounted upon said output shaft adjacent the base of said male clutch member, and planetary gears interposed between said ring gear and said sun gear, ratchet teeth on the edge of said sun gear adjacent the base of said male clutch member, corresponding ratchet teeth on the base of said male clutch member adapted to engage the ratchet teeth on said annular sun gear when said shaft with said male clutch member mounted thereon is moved axially away from said female clutch member, so as to apply the rotary power of said female clutch member through said gear train in reverse direction and at an increased rate of speed to said shaft.

4. A power transmission arrangement for rotary tools comprising an input and an output shaft, a first planetary gear train driven by said input shaft, a friction clutch member driven by said first planetary gear train, a second friction clutch member mounted upon said ouput shaft for rotation therewith and for engagement with said first clutch member to apply the rotary power of said first clutch member in a forward direction to said output shaft, a second planetary gear train interposed between said first clutch member and said output shaft and including an annular sun gear loosely mounted upon said ouput shaft, and means including said second clutch member operable to couple said sun gear positively to said output shaft while effecting disengagement of said clutch members, to apply the rotary power of said first clutch member in the reverse direction to said output shaft.

5. A power transmission arrangement comprising an input and an output shaft, a first planetary gear train, a first friction clutch member driven from said input shaft through said first gear train at a reduced rate of speed and in the same direction as said input shaft, a second friction clutch member mounted upon said output shaft for rotation therewith and for engagement with said first friciton clutch member to drive said output shaft in the same direction as, but at a reduced rate of speed as compared with said input shaft, a second planetary gear train interposed between said first clutch member and said output shaft and including an annular sun gear loosely mounted upon said output shaft, and means including said second clutch member operable to couple said sun gear positively to said output shaft, while effecting disengagement of said clutch members, to apply the rotary power of said first clutch member at an increased rate of speed and in the reverse direction to said output shaft.

6. A reversible power transmission for rotary tools comprising an outer housing, an input shaft rotatably supported in said housing at one end thereof, a sun gear firmly mounted upon the inner end of said input shaft, a ring gear arranged along the inner surface of said housing and disposed concentrically about said sun gear, a spider in the form of a hollow cone arranged within said housing for rotation about an axis coincident with the axis of said input shaft, planetary gears rotatably supported from said spider in mesh with said sun gear and said ring gear to impart the rotary power of said input shaft in the same direction but at a reduced rate of speed to said spider whenever said housing is held against rotation, an output shaft supported in said housing at the opposite end thereof for rotation about an axis coincident with the axis of said input shaft and for axially sliding movement relative to said housing, a conical head corresponding to the inner surface of said spider firmly mounted upon said output shaft for movement into frictional engagement with the interior of said spider to establish a coupling between said spider and said head and thus effect rotation of said output shaft in unison with said spider, an annular sun gear loosely mounted upon said output shaft, a ring gear supported from said spider concentrically about said annular sun gear, planetary gears rotatably supported from said housing in mesh with said annular sun gear and said last mentioned ring gear, a ring of ratchet teeth formed on the base of said conical head and corresponding ratchet teeth formed on the edge of said annular sun gear and adapted to be engaged by the ratchet teeth on said head to drive said head and the output shaft in reverse direction and at an increased rate of speed as compared with the rotary speed of said spider whenever said output shaft is pulled in a direction outwardly of said housing while the housing is held against rotation.

7. An arrangement according to claim 6 including means supported upon the outwardly projecting portion of said output shaft for locking said output shaft in its outwardly pulled drive-reversing position.

8. A reversible speed adjusting power transmission for rotary tools comprising a housing, an input shaft rotatably supported in said housing at one end thereof, a sun gear firmly mounted upon the inner end of said input shaft, a ring gear arranged along the inner surface of said housing and disposed concentrically about said sun gear, a spider in the form of a truncated hollow cone arranged within said housing for rotation about an axis coincident with the axis of said input shaft, planetary gears rotatably supported from the top of said spider in mesh with said sun gear and said ring gear to impart the rotary power of said input shaft in the same direction but at a reduced rate of speed to said spider whenever said housing is held against rotation, an output shaft supported in the opposite end of said housing for rotation about an axis coincident with the axis of said input shaft and for axially sliding movement relative to said housing, a conical head corresponding to the inner surface of said spider firmly mounted upon said output shaft, a friction lining arranged around the outer conical surface of said head to establish a friction coupling between said spider and said head and thus effect rotation of said output shaft in unison with said spider, an annular sun gear loosely mounted upon said output shaft adjacent the base of its conical head, a ring gear arranged along the bottom edge of said spider concentrically about said annular sun gear, planetary gears rotatably supported from said housing in mesh with said annular sun gear and said last mentioned ring gear, a ring of ratchet teeth on the base of said conical head around said output shaft and corresponding ratchet teeth on the edge of said annular sun gear adjacent the base of said conical head to be engaged by the ratchet teeth on said conical head and positively drive said head and the output shaft in a reverse direction and at an increased rate of speed as compared with the rotary speed of said spider whenever said output shaft is pulled in a direction outwardly of the housing a sufficient distance to disengage its conical head from the inner surface of said spider, while said housing is held against rotation.

9. A device according to claim 8 wherein the outwardly projecting portion of said output shaft carries a cross pin, and including a lock nut operable to enter the space between said housing and said cross pin when said output shaft is in its outwardly pulled position, to lock the transmission in its drive-reversing position.

References Cited in the file of this patent

UNITED STATES PATENTS

| | | |
|---|---|---|
| 1,648,421 | Olsen | Nov. 8, 1927 |
| 2,084,522 | Cotal | June 22, 1937 |
| 2,092,598 | Blair | Sept. 7, 1937 |
| 2,734,401 | Berndtson | Feb. 14, 1956 |
| 2,768,757 | Barry | Oct. 30, 1956 |

FOREIGN PATENTS

| | | |
|---|---|---|
| 663 | Great Britain | Apr. 10, 1908 |
| 255,823 | Italy | Nov. 12, 1927 |